US010745080B1

(12) United States Patent
Chen (10) Patent No.: US 10,745,080 B1
(45) Date of Patent: Aug. 18, 2020

(54) SINGLE FACE CLIPLESS PEDAL STRUCTURE OF ROAD BICYCLE (71) Applicant: Chung-I Chen, Taichung (TW)

(72) Inventor: Chung-I Chen, Taichung (TW)

( * ) Notice: Subject to any disclaimer, the term of this patent is extended or adjusted under 35 U.S.C. 154(b) by 0 days.

(21) Appl. No.: 16/677,135

(22) Filed: Nov. 7, 2019

(51) Int. Cl.
*B62M 3/08* (2006.01)

(52) U.S. Cl.
CPC .......... *B62M 3/086* (2013.01); *Y10T 74/2168* (2015.01)

(58) Field of Classification Search
CPC .......... B62M 3/806; B62M 3/08; B62M 3/10; Y10T 74/2168; Y10T 74/217
See application file for complete search history.

(56) References Cited

U.S. PATENT DOCUMENTS

| 4,864,887 | A  | * | 9/1989  | Rapisarda | A43B 5/14 74/594.6 |
| 6,035,743 | A  | * | 3/2000  | Gapinski | B62M 3/083 36/131 |
| 6,694,846 | B2 | * | 2/2004  | Muraoka | B62M 3/086 36/131 |
| 8,844,404 | B2 | * | 9/2014  | Chen | B62M 3/08 74/594.4 |
| 9,090,309 | B2 | * | 7/2015  | Swift | B62M 3/086 |
| 9,199,692 | B2 | * | 12/2015 | Chen | B62M 3/08 |
| 10,551,260 | B2 | * | 2/2020 | Chen | B62M 3/086 |

FOREIGN PATENT DOCUMENTS

TW         M443667 U      12/2012

* cited by examiner

*Primary Examiner* — Jeremy R Severson
(74) *Attorney, Agent, or Firm* — Muncy, Geissler, Olds & Lowe, P.C.

(57) ABSTRACT

A single-face clipless pedal structure includes a pedal body for a cleat to be disposed thereon. The axle portion of the pedal body is formed with a recessed stepped portion at the front end thereof The stepped portion is enclosed by a bottom wall and a lateral wall including a stopping face, a first and a second guiding faces at two ends of the stopping face. The first and the second guiding faces are arc concave-shaped. The cleat is formed with an abutting piece downward having an abutting face, a third and a fourth guiding faces at two ends of the abutting face. The abutting face abuts against the stopping face to prohibit the cleat from moving rearward and upward. The third and the fourth guiding faces correspond to the first and the second guiding faces respectively to facilitate the cleat to detach laterally.

8 Claims, 8 Drawing Sheets

SINGLE FACE CLIPLESS PEDAL STRUCTURE OF ROAD BICYCLE

BACKGROUND OF THE INVENTION

Field of the Invention

The present invention relates to a pedal structure, more especially to a pedal structure of road bicycle.

Description of the Prior Art

Structure of bicycle pedal is various according to usage. For example, road bicycle and normal bicycle have pedals in different structures. The pedal of normal bicycle has cleats on both sides, but the pedal of road bicycle has cleat only on a single face wherein the cleat is detachably disposed on the pedal body.

The cleat is positioned on the pedal body by two structures including making the front end of the cleat below the front flange of the pedal body, and positioning the rear end of the cleat by a positioning mechanism on the pedal body. However, when pedaling, the cleat may move rearward. To solve this problem, the cleat usually has a protruded abutting piece on the bottom thereof, as shown in patent TW M443667. The abutting piece abuts against a stopping face of the pedal body near the axle. To facilitate upward detachment of the cleat, the stopping face is usually inclined. However, the inclined stopping face cannot prohibit the cleat from sliding rearward well, or even makes the cleat easier to slide rearward and upward. Besides, the stopping face in patent TW M443667 is V-shaped to facilitate the rotation of the cleat while detaching. However, to prevent the cleat getting stuck during rotation, the abutting piece has a small contact area to be difficult to stop the cleat. In addition, to facilitate the cleat to rotate, the top face of the axle has to be smooth for abutting against the bottom face of the cleat. Thus, the cleat cannot be positioned on the pedal body firmly.

SUMMARY OF THE INVENTION

The main object of the present invention is to provide a single-face clipless pedal structure of road bicycle which is able to prevent the cleat from moving rearward and upward to detach from the pedal. However, the cleat is easy to detach laterally.

To achieve the above and other objects, a single-face clipless pedal structure of road bicycle of the present invention is adapted for a cleat to be disposed thereon. The cleat has a front engaging portion at a front side thereof and a rear engaging portion at a rear side thereof The cleat is formed with an abutting piece extending downward on a bottom face thereof The abutting piece is located between the front engaging portion and the rear engaging portion. The abutting piece has an abutting face at a side facing the rear engaging portion. The abutting piece further has a third guiding face and a fourth guiding face which are arc and convex at two sides of the abutting face. The single-face clipless pedal structure of road bicycle of the present invention includes a pedal body.

The pedal body defines a horizontal direction, a longitudinal direction, and a vertical direction which are perpendicular to each other. The pedal body has a front portion, an axle portion, and a rear portion along the longitudinal direction. The axle portion extends along the horizontal direction. The front portion is U-shaped and is connected to the axle portion with two ends thereof so that an insertion space is enclosed by the axle portion and the front portion. The rear portion has a positioning structure movable between a lock position and a release position. The axle portion has a top face. The top face is formed with a stepped portion recessed downward at a side thereof near the insertion space. The stepped portion is opened to the insertion space and at least comprises a bottom wall and a lateral wall which are unparallel to each other and connected to each other. The lateral wall includes a first guiding face, a stopping face, and a second guiding face along the horizontal direction. The first guiding face and the second guiding face bend toward the front portion to be arc concave-shaped so that the lateral wall is U-shaped when observed above the pedal body downward. The front portion has a stopping portion at a frontmost end toward the insertion space.

The stopping face of the pedal body is adapted for the abutting face of the cleat to abut against so that the cleat is prohibited from moving rearward further with respect to the pedal body. The first guiding face and the second guiding face correspond to the third guiding face and the fourth guiding face respectively. The stopping portion of the pedal body is adapted for connecting to the front engaging portion. The rear portion of the pedal body corresponds to the rear engaging portion. When the positioning structure is at the lock position, the rear engaging portion is restricted by the positioning structure to be prohibited from detaching upward. When the positioning structure is at the release position, the rear engaging portion is detachable upward.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIG. 1 to FIG. 7, the single-face clipless pedal structure of road bicycle of the present invention is adapted for a cleat 20 to be disposed thereon. The cleat 20 has a front engaging portion 21 at a front side thereof and a rear engaging portion 22 at a rear side thereof The cleat 20 is formed with an abutting piece 23 extending downward on a bottom face thereof The abutting piece 23 is located between the front engaging portion 21 and the rear engaging portion 22. The abutting piece 23 has an abutting face 231 at a side facing the rear engaging portion 22. The abutting piece 23 further has a third guiding face 232 and a fourth guiding face 233 which are arc and convex at two sides of the abutting face 231. The single-face clipless pedal structure of road bicycle includes a pedal body 10 and a wear resistant pad 30.

The pedal body 10 defines a horizontal direction, a longitudinal direction, and a vertical direction which are perpendicular to each other. The pedal body 10 has a front portion 12, an axle portion 11, and a rear portion 13 along the longitudinal direction. The axle portion 11 extends along the horizontal direction. The front portion 12 is U-shaped and is connected to the axle portion 11 with two ends thereof so that an insertion space 16 is enclosed by the axle portion 11 and the front portion 12. The rear portion 13 has a positioning structure 15 movable between a lock position and a release position. (In the present embodiment, the positioning structure 15 is pivotally disposed on the rear portion 13 of the pedal body 10 to be pivotable between the lock position and the release position.) The axle portion 11 has a top face 111. (Preferably, the top face 111 of the axle portion 11 is recessed to form a rib at a periphery thereof) The top face 111 is formed with a stepped portion 14 recessed downward at a side thereof near the insertion space 16. The stepped portion 14 is opened to the insertion space 16 and at least comprises a bottom wall 141 and a lateral wall 142 which are unparallel to each other and connected to each other. The lateral wall 142 includes a first guiding face 1422, a stopping face 1421, and a second guiding face 1423 along the horizontal direction. The first guiding face 1422 and the second guiding face 1423 bend toward the front portion 12 to be arc concave-shaped so that the lateral wall 142 is U-shaped when observed above the pedal body 10 downward. The front portion 12 has a stopping portion at a frontmost end toward the insertion space 16.

The stopping face 1421 of the pedal body 10 is adapted for the abutting face 231 of the cleat 20 to abut against so that the cleat 20 is prohibited from moving rearward further with respect to the pedal body 10. The first guiding face 1422 and the second guiding face 1423 correspond to the third guiding face 232 and the fourth guiding face 233 respectively. The stopping portion of the pedal body 10 is adapted for connecting to the front engaging portion 21. The rear portion 13 of the pedal body 10 corresponds to the rear engaging portion 22. When the positioning structure 15 is at the lock position, the rear engaging portion 22 is restricted by the positioning structure 15 to be prohibited from detaching upward. When the positioning structure 15 is at the release position, the rear engaging portion 22 is detachable upward.

The wear resistant pad 30 has an inclined wing portion 31 at each of two sides thereof Each of the wing portions 31 extends upward and outward. The top face 111 of the axle portion 11 has an inclined face 112 at each of two ends thereof along the horizontal direction. Each of the inclined faces 112 extends upward and outward. The wear resistant pad 30 is disposed on the top face 111 of the axle portion 11 to be sandwiched between the axle portion 11 and the cleat 20. The two wing portions 31 of the wear resistant pad 30 abutting against the two inclined faces 112. Preferably, the wear resistant pad 30 is made of metal. The wear resistant pad 30 is formed downward with a plurality of buckling protrusions 32 at a periphery thereof, and the top face 111 of the axle portion 11 is formed with a plurality of buckling recesses 1111. The buckling protrusions 32 are inserted into the buckling recesses 1111 to position the wear resistant pad 30 on the top face 111 of the axle portion 11. More preferably, an angle between the top face 111 of the axle portion 11 and each of the inclined faces 112 is 3-5 degrees.

In the present embodiment, the stopping face 1421 includes a first chamfer face 14211 connected to the bottom wall 141 and a vertical face 14212 connected to a top end of the first chamber face 14211. The first chamfer face 14211 is an arc concave face. A second chamfer face 14213 is further formed between the vertical face 14212 and the top face 111 of the axle portion 11. The second chamfer face 14213 is an arc convex face. The first guiding face 1422 and the second guiding face 1423 are connected to two opposite ends of the first chamfer face 14211. Each of the first guiding face 1422 and the second guiding face 1423 is recessed rearward and downward so that a vertical cross-section of each of the first guiding face 1422 and the second guiding face 1423 is arc concave-shaped.

Specifically, a length of the bottom wall of the stepped portion along the longitudinal direction is defined as L1. A length of the bottom wall of the stepped portion along the horizontal direction is defined as L2. A length of the first chamfer face along the horizontal direction is defined as L3. The ratio L1:L2:L3 is 1:7-8:10-12. A length of the first chamfer face 14211 along the vertical direction is substantially equal to L1 for smooth guiding. Thereby, the cleat can be firmly positioned but easy to detach laterally.

Figure 1:
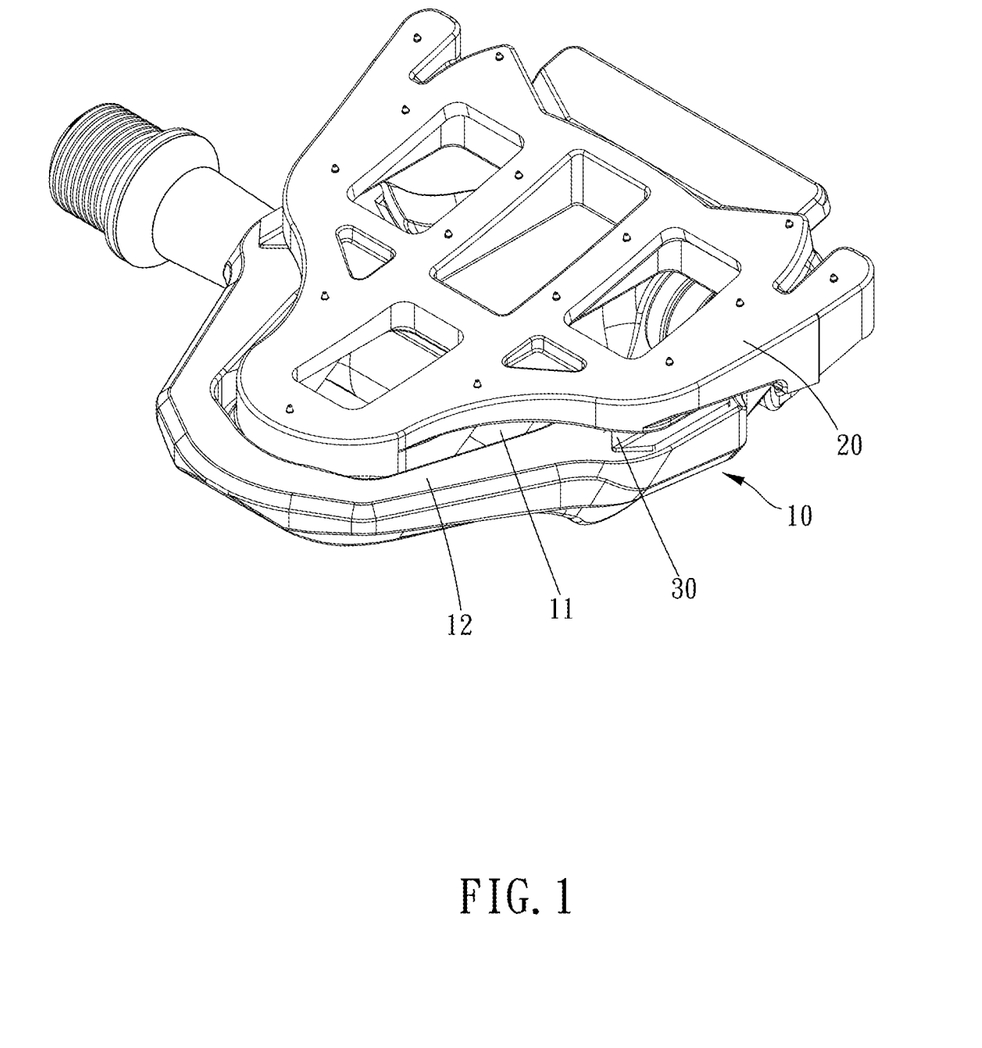
FIG. 1 is a stereogram of the present invention.
Figure 2:
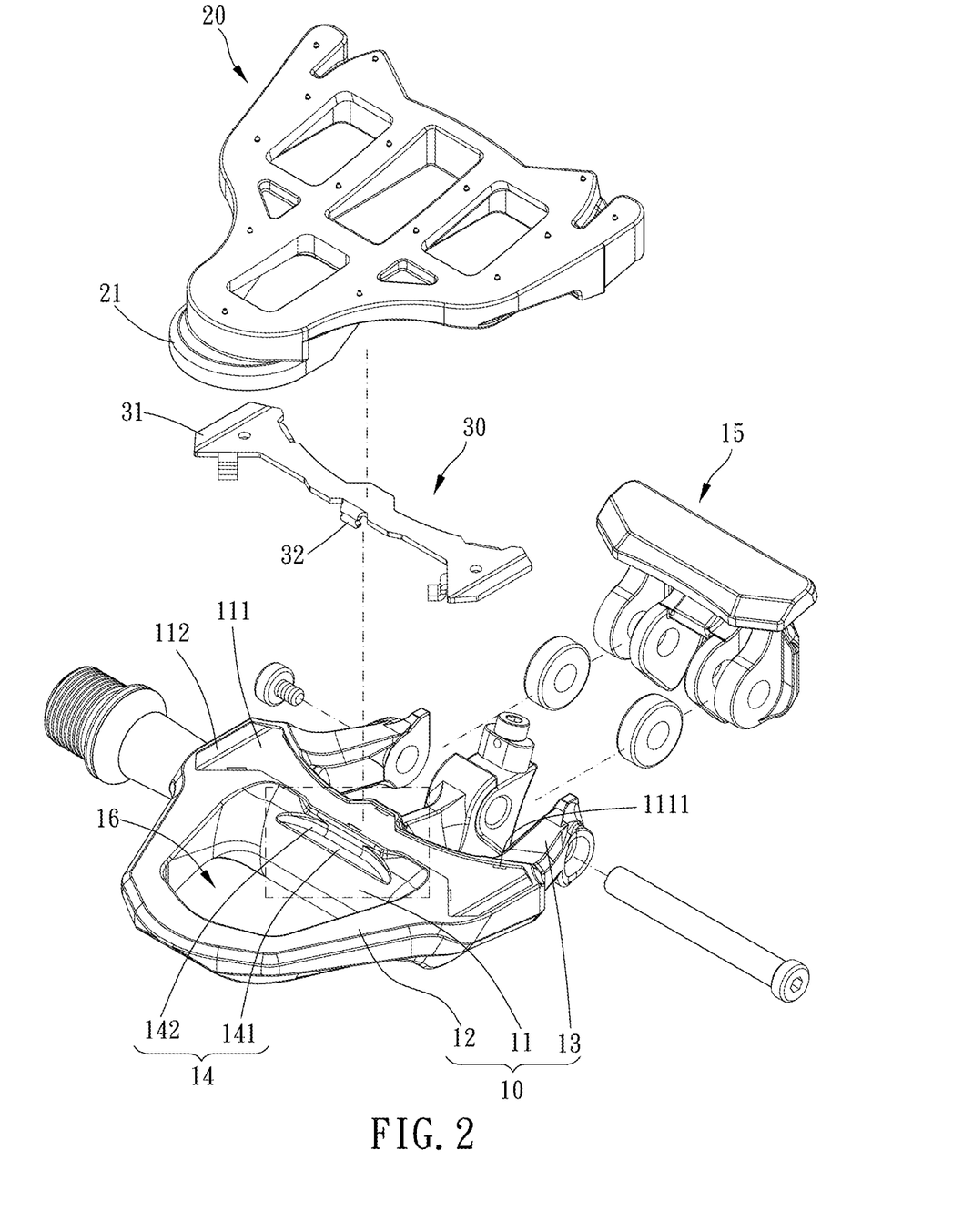
FIG. 2 is a breakdown drawing of the present invention.
Figure 2A:
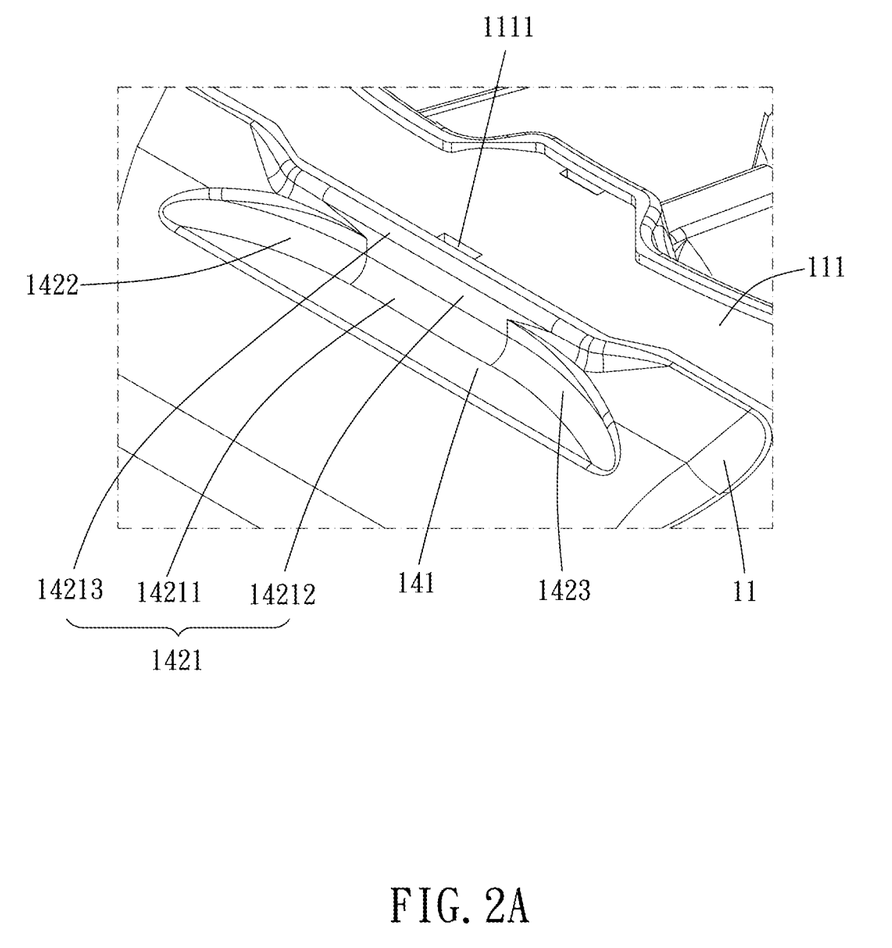
FIG. 2A is a partial enlargement of FIG. 2.
Figure 3:
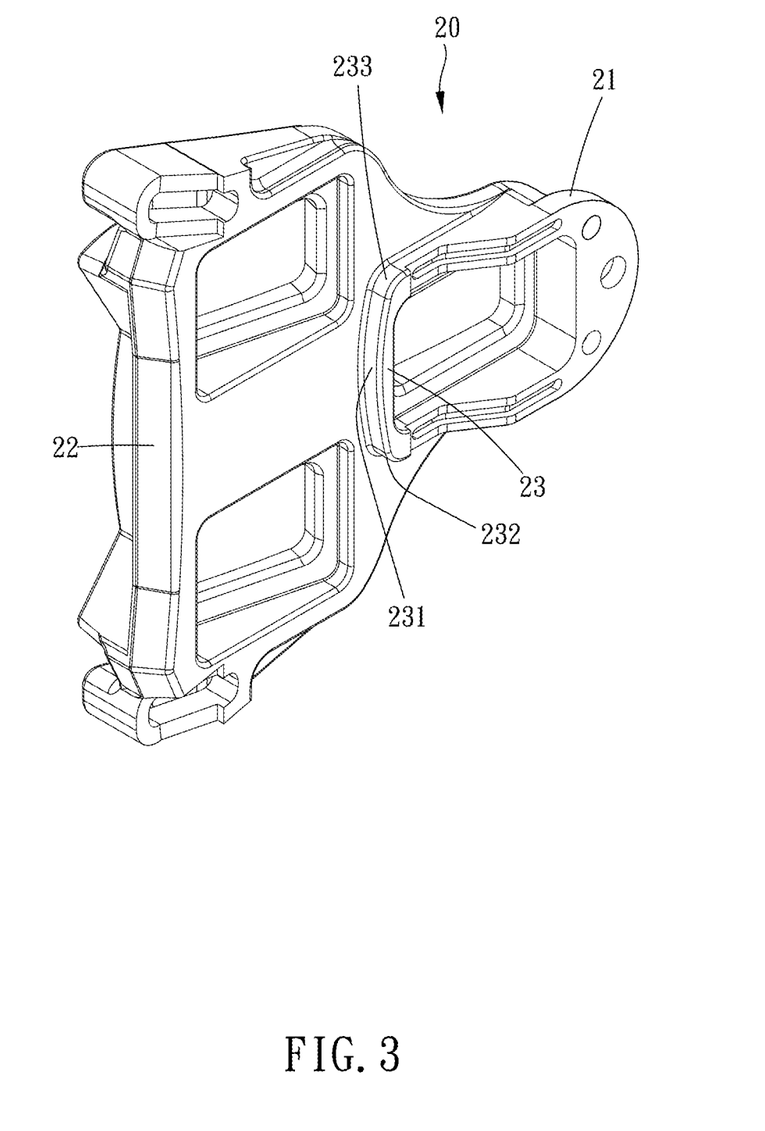
FIG. 3 is a stereogram of the present invention at an other angle.
Figure 4:
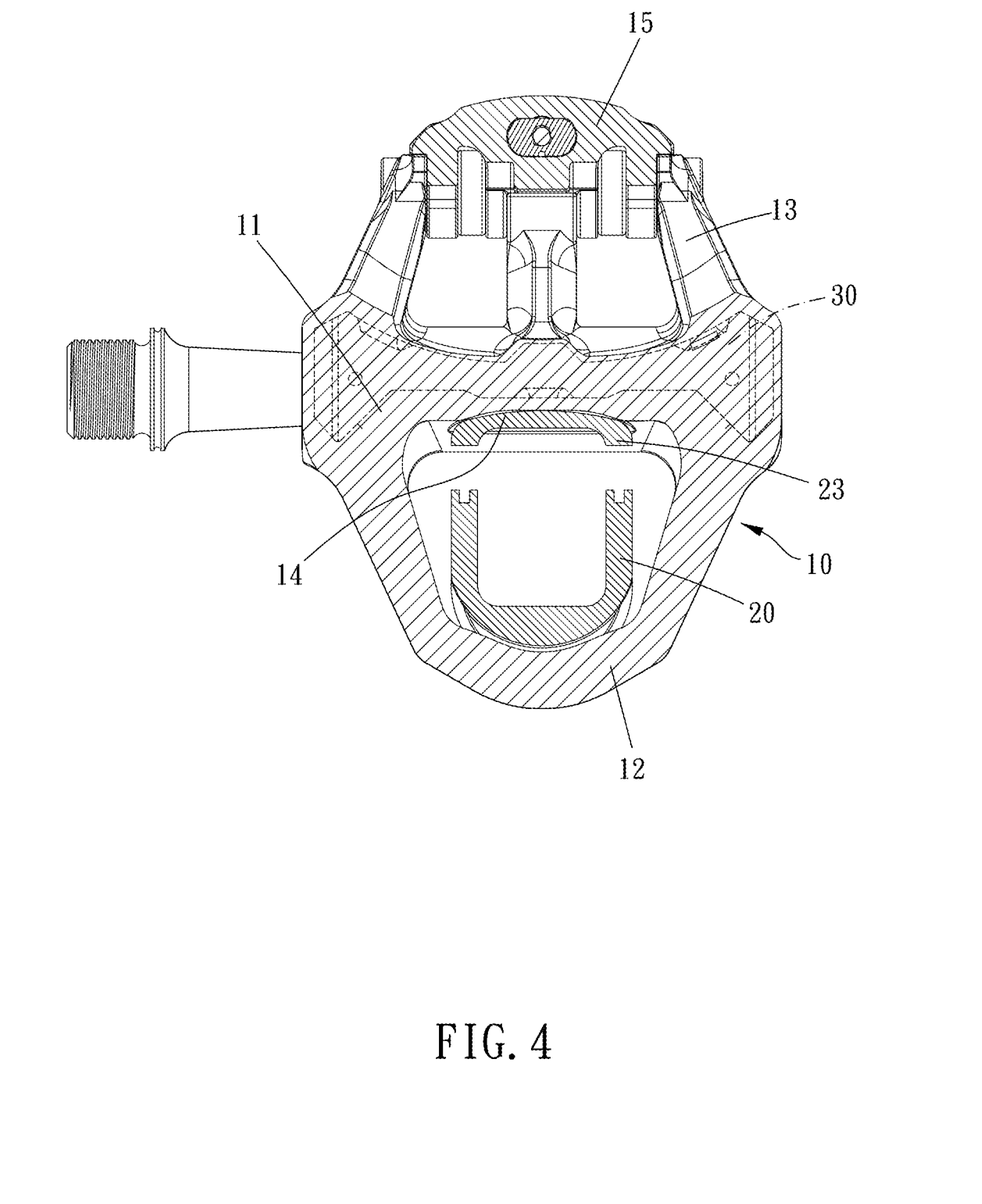
FIG. 4 is a cross-section of the present invention.
Figure 5:
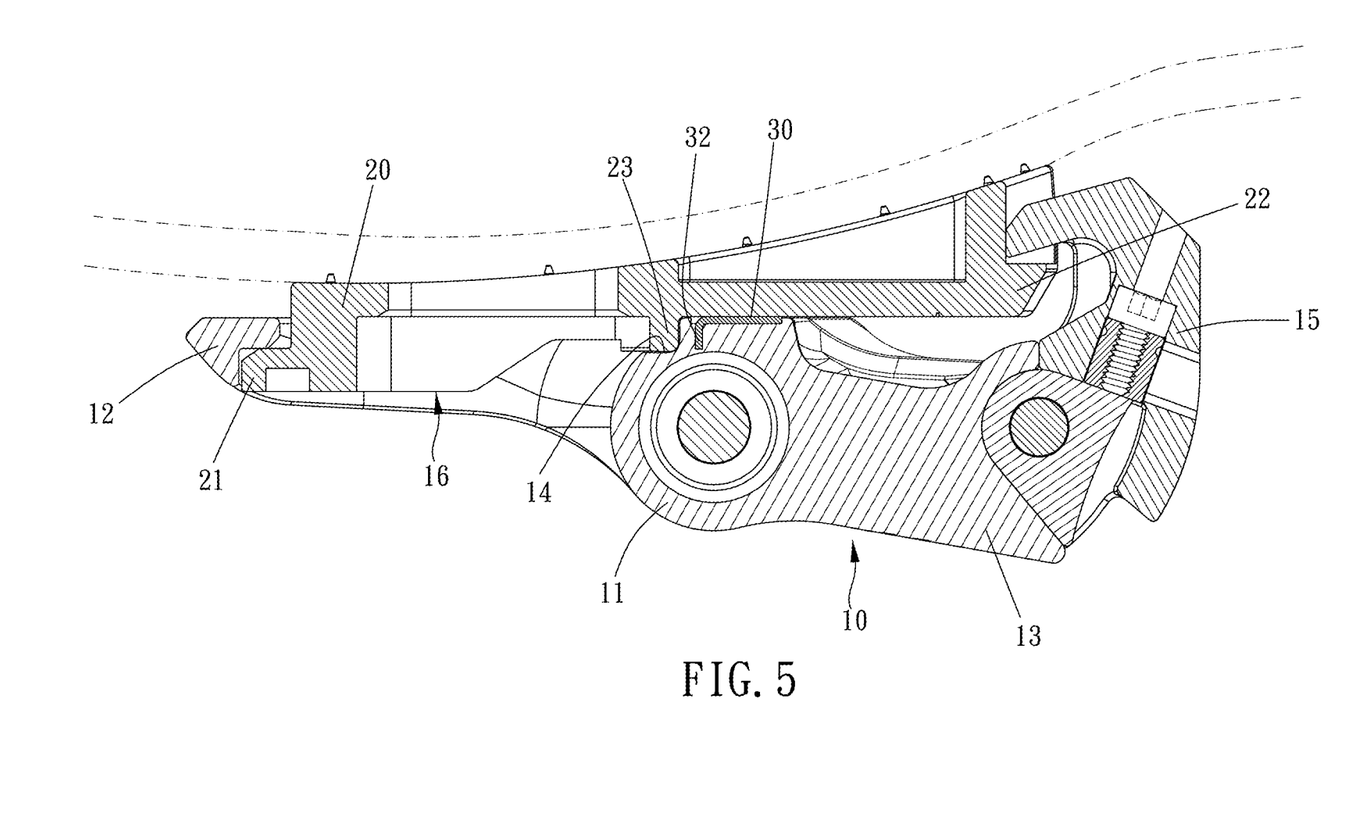
FIG. 5 and FIG. 6 are cross-sections of the present invention at other angles.
Figure 6:
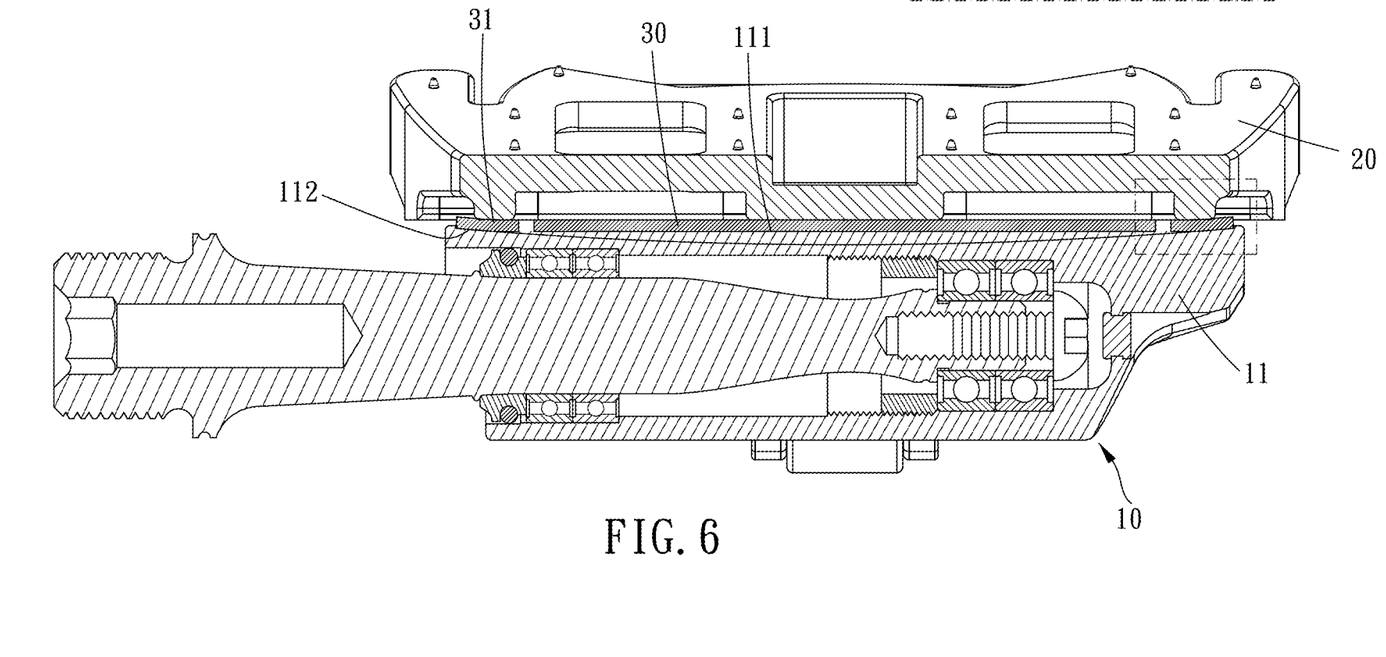
Figure 6A:
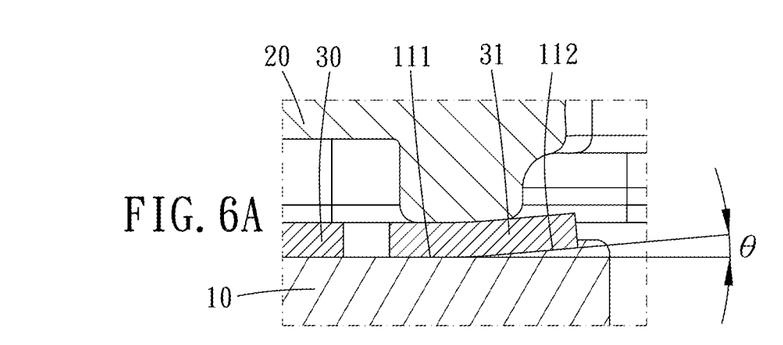
FIG. 6A is a partial enlargement of FIG. 6.
Figure 7:
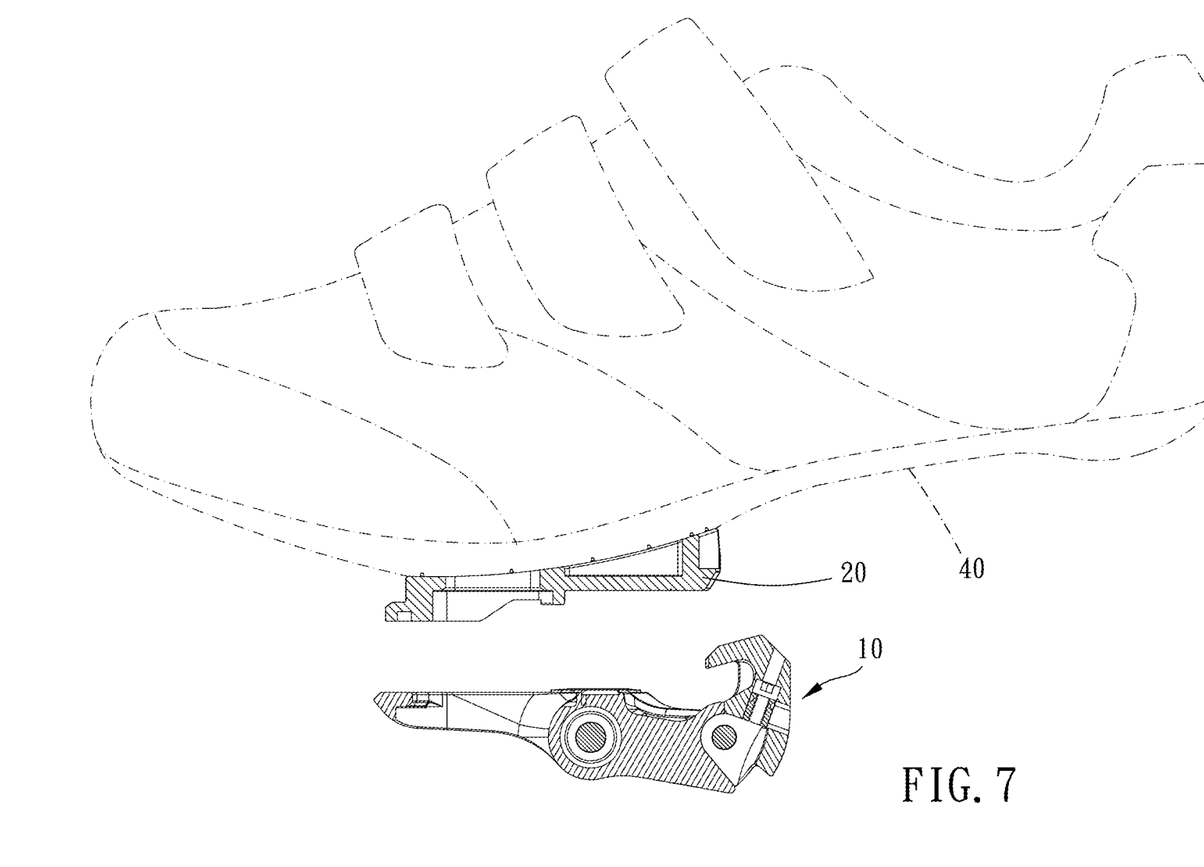
FIG. 7 is an illustration of the present invention in use.

When assembling the cleat 20 to the pedal body 10, make the cleat 20 incline frontward, and make the front engaging portion 21 (such as a flange near the bottom face) of the cleat 20 enter a space below the stopping portion of the pedal body 10. Thereafter, pivot the positioning structure 15 to the release position, make the cleat 20 abut against the top face of the pedal body 10, and pivot the positioning structure 15 to the lock position to position the cleat 20. At this time, the abutting piece 23 is arranged at the stepped portion 14 of the pedal body 10, and the abutting piece 23 abuts against the lateral wall 142 of the stepped portion 14. When the user pedals the cleat 20 with his sole 40, the cleat 20 bears a force rearward and upward. Because the cleat 20 abuts against the lateral wall 142 of the stepped portion 14 with its abutting piece 23, the cleat 20 may not move rearward and upward to keep the cleat stable. Besides, each of the first guiding face 1422 and the second guiding face 1423 of the stepped portion 14 is arc concave-shaped to facilitate the slight rotation of the cleat 20 so that the front engaging portion 21 is easy to detach from the stopping portion.

On the other hand, due to the wing portions 31 of the wear resistant pad 30 extending upward obliquely, the cleat 20 is able to slide outward along the wing portions 31 when the cleat 20 rotates for detachment via the first guiding face 1422 and the second guiding face 1423. Thus, the wear resistant pad 30 can keep the cleat 20 at the center normally, but also facilitate the detachment of the cleat 20.

In conclusion, the single-face clipless pedal structure of road bicycle of the present invention can position the cleat to prevent it from slide rearward. In addition, the first guiding face and the second guiding face help the cleat rotate for detachment. Besides, the inclined wing portions of the wear resistant pad can further facilitate the cleat to slide outward. Thus, the cleat can be firmly positioned on the pedal body normally to avoid the cleat from sliding rearward when pedaling. However, the cleat is easy to detach from the pedal body.

What is claimed is:

1. A single-face clipless pedal structure of road bicycle, adapted for a cleat to be disposed thereon, the cleat having a front engaging portion at a front side thereof and a rear engaging portion at a rear side thereof, the cleat being formed with an abutting piece extending downward on a bottom face thereof, the abutting piece being located between the front engaging portion and the rear engaging portion, the abutting piece having an abutting face at a side facing the rear engaging portion, the abutting piece further having a third guiding face and a fourth guiding face which are arc and convex at two sides of the abutting face, the single-face clipless pedal structure of road bicycle including:

a pedal body, defining a horizontal direction, a longitudinal direction, and a vertical direction which are perpendicular to each other, the pedal body having a front portion, an axle portion, and a rear portion along the longitudinal direction, the axle portion extending along the horizontal direction, the front portion being U-shaped and being connected to the axle portion with two ends thereof so that an insertion space is enclosed by the axle portion and the front portion, the rear portion having a positioning structure movable between a lock position and a release position, the axle portion having a top face, the top face being formed with a stepped portion recessed downward at a side thereof near the insertion space, the stepped portion being opened to the insertion space and at least comprising a bottom wall and a lateral wall which are unparallel to each other and connected to each other, the lateral wall including a first guiding face, a stopping face, and a second guiding face along the horizontal direction, the first guiding face and the second guiding face bending toward the front portion to be arc concave-shaped so that the lateral wall is U-shaped when observed above the pedal body downward, the front portion having a stopping portion at a frontmost end toward the insertion space;

wherein the stopping face of the pedal body is adapted for the abutting face of the cleat to abut against so that the cleat is prohibited from moving rearward further with respect to the pedal body, the first guiding face and the second guiding face correspond to the third guiding face and the fourth guiding face respectively, the stopping portion of the pedal body is adapted for connecting to the front engaging portion, the rear portion of the pedal body corresponds to the rear engaging portion; when the positioning structure is at the lock position, the rear engaging portion is restricted by the positioning structure to be prohibited from detaching upward; when the positioning structure is at the release position, the rear engaging portion is detachable upward;

wherein the single-face clipless pedal structure of road bicycle further including a wear resistant pad, the wear resistant pad has an inclined wing portion at each of two sides thereof, each of the wing portions extends upward and outward, the top face of the axle portion has an inclined face at each of two ends thereof along the horizontal direction, each of the inclined faces extends upward and outward, the wear resistant pad is disposed on the top face of the axle portion to be sandwiched between the axle portion and the cleat, the two wing portions of the wear resistant pad abut against the two inclined faces;

wherein an angle between the top face of the axle portion and each of the inclined faces is 3-5 degrees.

2. The single-face clipless pedal structure of road bicycle of claim 1, wherein the wear resistant pad is formed downward with a plurality of buckling protrusions at a periphery thereof, the top face of the axle portion is formed with a plurality of buckling recesses, the buckling protrusions are inserted into the buckling recesses to position the wear resistant pad on the top face of the axle portion.

3. The single-face clipless pedal structure of road bicycle of claim 1, wherein the wear resistant pad is made of metal.

4. The single-face clipless pedal structure of road bicycle of claim 1, wherein the stopping face includes a first chamfer face connected to the bottom wall and a vertical face connected to a top end of the first chamfer face, the first chamfer face is an arc concave face.

5. The single-face clipless pedal structure of road bicycle of claim 4, wherein a second chamfer face is formed between the vertical face and the top face of the axle portion, the second chamfer face is an arc convex face.

6. The single-face clipless pedal structure of road bicycle of claim 5, wherein the wear resistant pad is formed downward with a plurality of buckling protrusions at a periphery thereof, the top face of the axle portion is formed with a plurality of buckling recesses, the buckling protrusions are inserted into the buckling recesses to position the wear resistant pad on the top face of the axle portion; wherein the wear resistant pad is made of metal; each of the first guiding face and the second guiding face is recessed rearward and downward so that a vertical cross-section of each of the first guiding face and the second guiding face is arc concave-shaped; wherein the top face of the axle portion is recessed to form a rib at a periphery thereof; wherein the positioning structure is pivotally disposed on the rear portion of the pedal body to be pivotable between the lock position and the release position; wherein a length of the bottom wall of the stepped portion along the longitudinal direction is defined as L1, a length of the bottom wall of the stepped portion along the horizontal direction is defined as L2, a length of the first chamfer face along the horizontal direction is defined as L3, L1:L2:L3 is 1:7-8:10-12.

7. The single-face clipless pedal structure of road bicycle of claim 4, wherein the first guiding face and the second guiding face are connected to two opposite ends of the first chamfer face, each of the first guiding face and the second guiding face is recessed rearward and downward so that a vertical cross-section of each of the first guiding face and the second guiding face is arc concave-shaped.

8. A single-face clipless pedal structure of road bicycle, adapted for a cleat to be disposed thereon, the cleat having a front engaging portion at a front side thereof and a rear engaging portion at a rear side thereof, the cleat being formed with an abutting piece extending downward on a bottom face thereof, the abutting piece being located between the front engaging portion and the rear engaging portion, the abutting piece having an abutting face at a side facing the rear engaging portion, the abutting piece further having a third guiding face and a fourth guiding face which are arc and convex at two sides of the abutting face, the single-face clipless pedal structure of road bicycle including;

a pedal body, defining a horizontal direction, a longitudinal direction, and a vertical direction which are perpendicular to each other, the pedal body having a front portion, an axle portion, and a rear portion along the longitudinal direction, the axle portion extending along the horizontal direction, the front portion being U-shaped and being connected to the axle portion with two ends thereof so that an insertion space is enclosed by the axle portion and the front portion, the rear portion having a positioning structure movable between a lock position and a release position, the axle portion having a top face, the top face being formed with a stepped portion recessed downward at a side thereof near the insertion space, the stepped portion being opened to the insertion space and at least comprising a bottom wall and a lateral wall which are unparallel to each other and connected to each other, the lateral wall including a first guiding face, a stopping face, and a second guiding face along the horizontal direction, the first guiding face and the second guiding face bending toward the front portion to be arc concave-shaped so that the lateral wall is U-shaped when observed above the pedal body downward, the front portion having a stopping portion at a frontmost end toward the insertion space; wherein the stopping face of the pedal body is adapted for the abutting face of the cleat to abut against so that the cleat is prohibited from moving rearward further with respect to the pedal body, the first guiding face and the second guiding face correspond to the third guiding face and the fourth guiding face respectively, the stopping portion of the pedal body is adapted for connecting to the front engaging portion, the rear portion of the pedal body corresponds to the rear engaging portion, when the positioning structure is at the lock position, the rear engaging portion is restricted by the positioning structure to be prohibited from detaching upward; when the positioning structure is at the release position, the rear engaging portion is detachable upward;

wherein each of the first guiding face and the second guiding face is recessed rearward and downward so that a vertical cross-section of each of the first guiding face and the second guiding face is arc concave-shaped.

* * * * *